United States Patent
Hosmani

(10) Patent No.: US 11,853,163 B2
(45) Date of Patent: Dec. 26, 2023

(54) SELECTIVE REBUILD OF INTERRUPTED DEVICES IN DATA STORAGE DEVICE ARRAYS

(71) Applicant: Western Digital Technologies, Inc., San Jose, CA (US)

(72) Inventor: Kushal Hosmani, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 56 days.

(21) Appl. No.: 17/528,768

(22) Filed: Nov. 17, 2021

(65) Prior Publication Data

US 2023/0153206 A1    May 18, 2023

(51) Int. Cl.
G06F 11/00 (2006.01)
G06F 11/10 (2006.01)
G06F 13/24 (2006.01)

(52) U.S. Cl.
CPC ...... *G06F 11/1092* (2013.01); *G06F 11/1048* (2013.01); *G06F 13/24* (2013.01)

(58) Field of Classification Search
CPC ............. G06F 11/1048; G06F 11/1092; G06F 3/0619; G06F 3/0653; G06F 3/0689
See application file for complete search history.

(56) References Cited

U.S. PATENT DOCUMENTS

| | | | | |
|---|---|---|---|---|
| 5,758,054 A * | 5/1998 | Katz | ................... | G06F 11/1441 365/228 |
| 7,454,668 B1 * | 11/2008 | Yochai | ................ | G06F 11/1435 714/52 |
| 7,870,464 B2 | 1/2011 | Hafner et al. | | |
| 10,360,119 B2 | 7/2019 | Jess et al. | | |
| 2004/0034817 A1 * | 2/2004 | Talagala | ............. | G11B 20/1816 |
| 2013/0198585 A1 * | 8/2013 | Braam | ................ | G06F 11/1076 714/763 |
| 2014/0164825 A1 * | 6/2014 | Grcanac | .............. | G06F 11/1092 714/6.24 |
| 2019/0332480 A1 * | 10/2019 | Kang | .................. | G06F 11/1435 |
| 2019/0347015 A1 | 11/2019 | Luo et al. | | |
| 2020/0042388 A1 | 2/2020 | Roberts | | |
| 2020/0341844 A1 | 10/2020 | Shivanand et al. | | |
| 2020/0341874 A1 | 10/2020 | Zhuo et al. | | |

(Continued)

OTHER PUBLICATIONS

Li, Mingqiang et al., Toward I/O-Efficient Protection Against Silent Data Corruption in RAID Arrays, 2014, IEEE (Year: 2014).*

(Continued)

*Primary Examiner* — Marc Duncan
(74) *Attorney, Agent, or Firm* — PATENT LAW WORKS LLP

(57) ABSTRACT

Systems and methods for selective rebuild of interrupted data storage devices in storage arrays are described. A controller determines an operating interruption of a data storage device in a redundant array of independent disks (RAID) configuration. In response to the interruption, the controller determines a last block time value for the last successfully stored RAID block in the interrupted storage device and one or more incomplete RAID stripes that the interrupted storage device did not complete. The controller then selectively rebuilds the incomplete RAID stripes from the other storage devices in the RAID configuration.

20 Claims, 7 Drawing Sheets

(56) References Cited

U.S. PATENT DOCUMENTS

2020/0356281 A1   11/2020   Zagade et al.

OTHER PUBLICATIONS

Hafner, J.L. et al., Undetected disk errors in RAID arrays, 2008, IBM (Year: 2008).*
International Search Report and Written Opinion for International Application No. PCT/US2022/029344, dated Nov. 1, 2022, 9 pgs.

* cited by examiner

US 11,853,163 B2

SELECTIVE REBUILD OF INTERRUPTED DEVICES IN DATA STORAGE DEVICE ARRAYS

TECHNICAL FIELD

The present disclosure generally relates to storage systems supporting redundant array of independent disks (RAID) configurations and, more particularly, to managing rebuild operations for RAID set of data storage devices.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

These multi-device storage systems may be configured in data centers that include a large number of rack-based storage systems with corresponding sets of swappable data storage devices. These rack-based storage systems may include a variety of power, network, and other physical connections for maintaining operations. The size and complexity of these systems may lead to temporary power, connection, and/or other service interruptions, such as when a loose connection and vibration or other movement in the associate rack cause a temporary disconnection or a system administrator accidentally removes the incorrect device, notices the mistake, and immediately replaces it back into its slot. Variations in power and slot positions may also cause variations in the timing of power management states of devices, where one device goes offline before other devices in a group, such as a RAID set of devices. These temporary interruptions are becoming increasingly common in large, distributed, multi-device storage systems.

Any of the foregoing errors, while temporary, may cause one or more storage devices in a RAID set to go out of synchronization with the other storage devices in the same RAID set. In some configurations, a storage device going out-of-sync may trigger a rebuild of the impacted RAID set. As the capacity of data storage devices has continued to increase, the amount of time required to rebuild a RAID set has become very large and costly from service loss, system design, and energy perspectives.

Therefore, there still exists a need for storage systems that support partial rebuilds targeted to resynchronizing storage devices after temporary interruptions.

SUMMARY

Various aspects for selective rebuild of interrupted data storage devices in RAID arrays are described. More particularly, time counters may be stored with each RAID block in the storage devices and used to determine which devices are out of sync to selectively rebuild the stripes containing incomplete blocks. This may enable partial rebuild of a limited number of stripes that were compromised during the interruption, without requiring a full rebuild of the RAID set.

One general aspect includes a system including a plurality of data storage devices and a redundant array of independent disks (RAID) controller. The plurality of data storage devices may include a non-volatile storage medium configured to store host data, where: the host data is configured in a plurality of RAID blocks; each RAID block corresponds to a RAID stripe distributed across the plurality of data storage devices; and each RAID block has a block time value corresponding to a time when that RAID block was stored to the corresponding data storage device of the plurality of data storage devices. The RAID controller is configured to: determine an operating interruption for at least one data storage device of the plurality of data storage devices; determine, responsive to the operating interruption, a last block time value for a last RAID block stored by the at least one data storage device; determine, based on the last block time value, at least one incomplete RAID stripe; and selectively rebuild the at least one incomplete RAID stripe.

Implementations may include one or more of the following features. Each data storage device of the plurality of data storage devices may be configured to store, adjacent to each RAID block in the non-volatile storage medium, the block time value of that RAID block. Each data storage device of the plurality of data storage devices may be: configured as a block storage device including a host data block size and an extended block size that defines additional storage locations beyond the host data block size for each host data block and further configured to store the block time value in the additional storage locations corresponding to the extended block size for each RAID block. Each data storage device of the plurality of data storage devices may be configured to store, in metadata storage, a device time value corresponding to a time when a most recent RAID block of a most recent RAID stripe was stored in the non-volatile storage medium for that data storage device. The RAID controller may be further configured to: store, in RAID metadata, a time counter value for a most recent RAID stripe stored in the plurality of data storage devices; determine, from the at least one data storage device, the last block time value; and determine, based on the time counter value and the last block time value, the at least one incomplete RAID stripe. The RAID controller may be further configured to send, to the plurality of data storage devices, the time counter value to be stored as the block time value adjacent to each RAID block in the non-volatile storage medium. The RAID controller may be further configured to: selectively increment the time counter value by a configurable granularity threshold; and write a plurality of RAID stripes to the plurality of data storage devices between each increment. The RAID controller may be further configured to: determine, based on the block time values for RAID blocks stored in the at least one data storage device, a last complete RAID stripe; and determine, based on the block time values for RAID blocks stored in another data storage device of the plurality of data storage devices, the at least one incomplete RAID stripe since the last complete RAID stripe. The RAID controller may be further configured to: determine a loss of operation for the at least one data storage device; enter, responsive to the loss of operation, a degraded state for a RAID set corresponding to the plurality of data storage devices; detect an operating data storage device corresponding to a position of the at least one data storage device; determine, based on a device signature, that the operating data storage device is the at least one data storage device; and determine, responsive to the operating data storage device being the at least one data storage device, the operating interruption. The RAID controller may be further configured to: determine an interruption counter to measure an elapsed time from the loss of operation; determine an interruption threshold; selectively initiate, responsive to the interruption counter exceeding the interruption threshold, a complete rebuild of the RAID set; determine a rebuild count of the at least one incomplete RAID stripes; determine a rebuild threshold; and selectively initiate, responsive to the rebuild count exceeding the rebuild threshold, the complete rebuild of the RAID set.

Another general aspect includes a computer-implemented method including: storing, to a plurality of data storage devices that include a non-volatile storage medium, host data, where the host data is configured in a plurality of RAID blocks, each RAID block corresponds to a RAID stripe distributed across the plurality of data storage devices, and each RAID block has a block time value corresponding to a time when that RAID block was stored to the corresponding data storage device of the plurality of data storage devices; determining an operating interruption for at least one data storage device of the plurality of data storage devices; determining, responsive to the operating interruption, a last block time value for a last RAID block stored by the at least one data storage device; determining, based on the last block time value, at least one incomplete RAID stripe; and selectively rebuilding the at least one incomplete RAID stripe.

Implementations may include one or more of the following features. The computer-implemented method may include storing, adjacent to each RAID block in the non-volatile storage medium, the block time value of that RAID block. The computer-implemented method may include configurating the plurality of data storage devices as block storage devices including: a host data block size and an extended block size that defines additional storage locations beyond the host data block size for each host data block, where storing the block time value of each RAID block includes storing the block time value in the additional storage locations corresponding to the extended block size for that RAID block. The computer-implemented method may include storing, in metadata storage for each data storage device of the plurality of data storage devices, a device time value corresponding to a time when a most recent RAID block of a most recent RAID stripe was stored in the non-volatile storage medium for that data storage device. The computer-implemented method may include: storing, in raid metadata, a time counter value for a most recent RAID stripe stored in the plurality of data storage devices; determining, from the at least one data storage device, the last block time value; and determining, based on the time counter value and the last block time value, the at least one incomplete RAID stripe. The computer-implemented method may include sending, to the plurality of data storage devices, the time counter value to be stored as the block time value adjacent to each RAID block in the non-volatile storage medium. The computer-implemented method may include: selectively incrementing the time counter value by a configurable granularity threshold; and writing a plurality of RAID stripes to the plurality of data storage devices between each increment. The computer-implemented method may include: determining, based on the block time values for RAID blocks stored in the at least one data storage device, a last complete RAID stripe; and determining, based on the block time values for RAID blocks stored in another data storage device of the plurality of data storage devices, the at least one incomplete RAID stripe since the last complete RAID stripe. The computer-implemented method may include: determining a loss of operation for the at least one data storage device; entering, responsive to the loss of operation, a degraded state for a RAID set corresponding to the plurality of data storage devices; detecting an operating data storage device corresponding to a position of the at least one data storage device; determining, based on a device signature, that the operating data storage device is the at least one data storage device; and determining, responsive to the operating data storage device being the at least one data storage device, the operating interruption.

Still another general aspect includes a system that includes a plurality of data storage devices including a non-volatile storage medium configured to store host data, where: the host data is configured in a plurality of RAID blocks; each RAID block corresponds to a RAID stripe distributed across the plurality of data storage devices; and each RAID block has a block time value corresponding to a time when that RAID block was stored to the corresponding data storage device of the plurality of data storage devices. The system also includes: means for determining an operating interruption for at least one data storage device of the plurality of data storage devices; means for determining, responsive to the operating interruption, a last block time value for a last RAID block stored by the at least one data storage device; means for determining, based on the last block time value, at least one incomplete RAID stripe; and means for selectively rebuilding the at least one incomplete RAID stripe.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to more efficiently rebuild data in response to a temporary interruption of a data storage device in a RAID set, such as by using time counters associated with RAID storage operations to identify RAID stripes that were impacted by the interruption. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
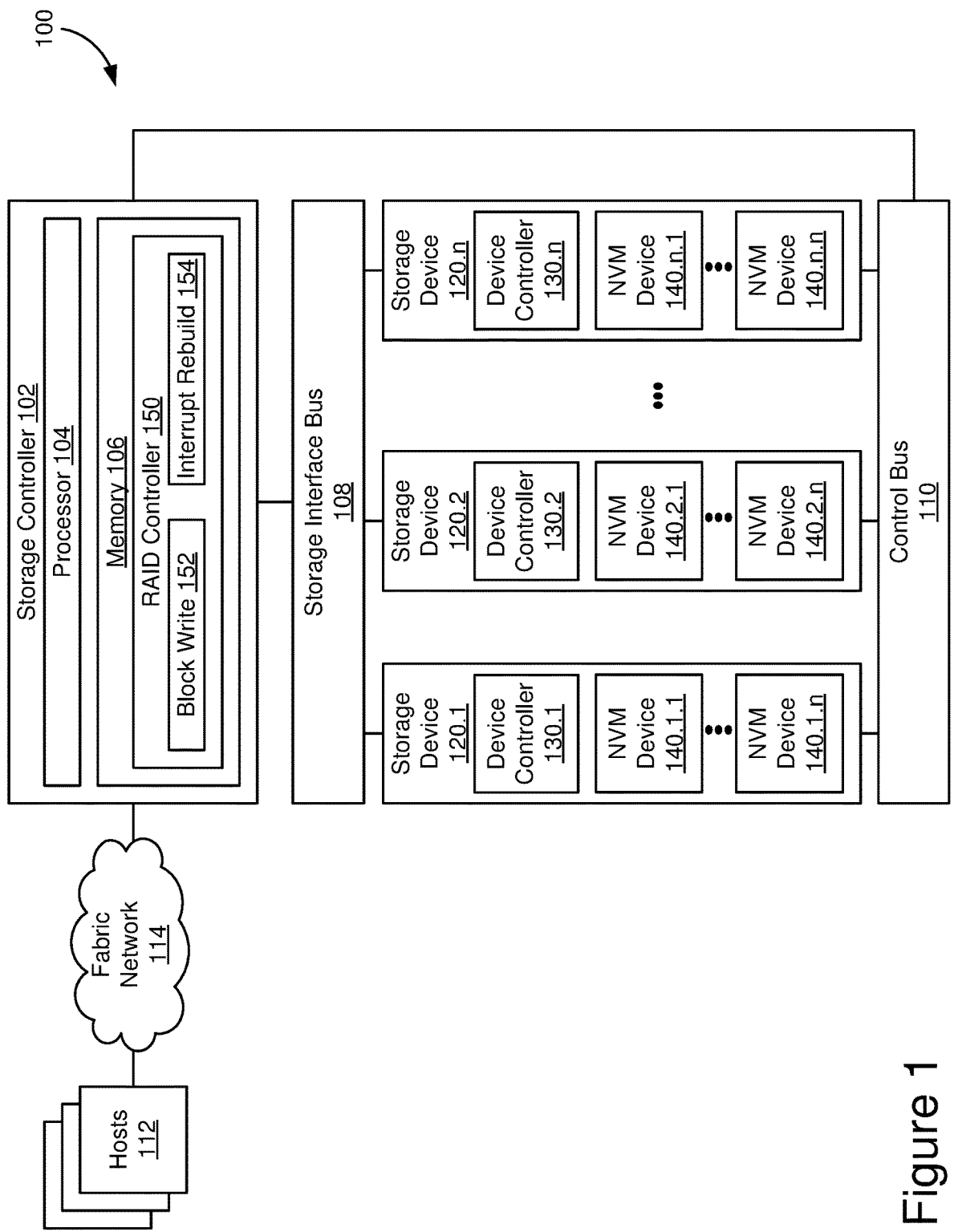
FIG. 1 schematically illustrates a multi-device storage system supporting selective rebuild of interrupted storage devices.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102 and each containing a non-volatile storage medium. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, the RAID functions of storage controller 102 may be embodied in or managed from host systems 112. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.$n$ may include a non-volatile memory (NVM) or device controller 130 based on compute resources (processor and memory) and a plurality of NVM or non-volatile storage media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs) including magnetic non-volatile storage media disks written to and read by a head and corresponding read/write channel electronics. In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage devices 120 may be configured as block storage devices with a defined host data block size, such as 512 bytes, 2048 bytes, 4,096 bytes, or another host block size. Storage devices 120 may be configured for extended block storage that includes additional storage locations beyond those allocated to the host block size. For example, each 512 byte host block may include additional bytes for system or security related data, such as protection information meeting T10 protection information standards. In some embodiments, an 8-byte data integrity field may be added to each host data block to provide an extended block size of 520 bytes and may be used for protection information, or may be used by the system for another purpose if protection information is not enabled. Some block storage configurations may include other extended block configurations, such as extended block sizes of 544 bytes, 560 bytes, 580 bytes, etc., where the host block size remains 512 bytes and different amounts of system storage space are added to each block, such as 32, 48, or 68 bytes of extended storage locations.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications.

Storage controller 102 may include one or more central processing units (CPUs) or processors 104 for executing compute operations, storage management operations, RAID operations, and/or other instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute a fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a RAID controller 150 between host systems 112 and storage devices 120 to manage storage of redundant data distributed across storage devices 120 for data reliability and recovery. In some embodiments, RAID controller 150 may be configured for selective rebuild of RAID stripes when the operations of one or more of storage devices 120 are interrupted temporarily, resulting in incomplete RAID stripes. For example, RAID controller 150 may be configured to determine and rebuild the stripes that were written or updated during or following the interruption. A storage device operating interruption may include any event that renders a storage device temporarily unavailable for writing one or more allocated blocks of a RAID stripe and results in the storage device being unresponsive to commands or operations from storage controller 102. For example, a storage device may lose power, network, and/or storage interface (to storage interface bus 108 and/or control bus 110) connections to due loose physical connections or manipulation of the cables, mounting, housing, or other rack components in which the storage device is operating and those interruptions may be quickly restored. One example cause of a storage device being temporarily unavailable may be its accidental removal from the slot or bay in which it is mounted, followed by replacement as soon as the error is detected. Another example may be accidental or uneven power cycling of individual storage devices.

RAID controller 150 may include a block write function 152 and an interrupt rebuild function 154 to support the selective rebuild of incomplete RAID stripes. In some embodiments, block write function 152 may be configured to add a time counter value to each RAID block stored to storage devices 120. For example, each RAID block may include additional metadata including a time counter value determined by RAID controller 150 and shared across all RAID blocks and RAID stripes written during a particular time window. In some embodiments, the time counter value written to a particular RAID block may be stored as a block time value in the additional storage locations provided by an extended block format. Block time values may later be used to determine which blocks (and corresponding stripes) are complete and identify any incomplete stripes resulting from a storage device interruption.

Interrupt rebuild function 154 may be configured to respond to a storage device interruption and use the block time values written by block write function 152 to determine the scope of a partial rebuild. In some embodiments, interrupt rebuild function 154 may be configured to operate when a RAID set, such as storage devices 120.1-120.*n*, enters a degraded state due to loss of operation of at least one storage device. Once loss of operation is established, RAID controller 150 may wait for some configurable waiting period to detect the return of the lost storage device and verify that the returned storage device is the same storage device that was lost (and not a replacement storage device), such as by comparing storage device signature values. Upon determining an operating interruption, interrupt rebuild function 154 may compare the block time values of the last blocks stored by the interrupted storage device with the block time values of the last block stored by at least one of the uninterrupted storage devices to determine one or more incomplete RAID stripes. If, for each incomplete RAID stripe, the missing data blocks from the interrupted storage device are within the recovery capabilities of the RAID configuration and the data blocks (including parity data) stored to the uninterrupted storage devices, interrupt rebuild function 154** may initiate a partial rebuild of the RAID set targeting only the incomplete RAID stripes. Upon completion of the rebuild of the incomplete RAID stripes, the partially rebuilt (and now complete) RAID set may leave the degraded state and return to normal operation.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
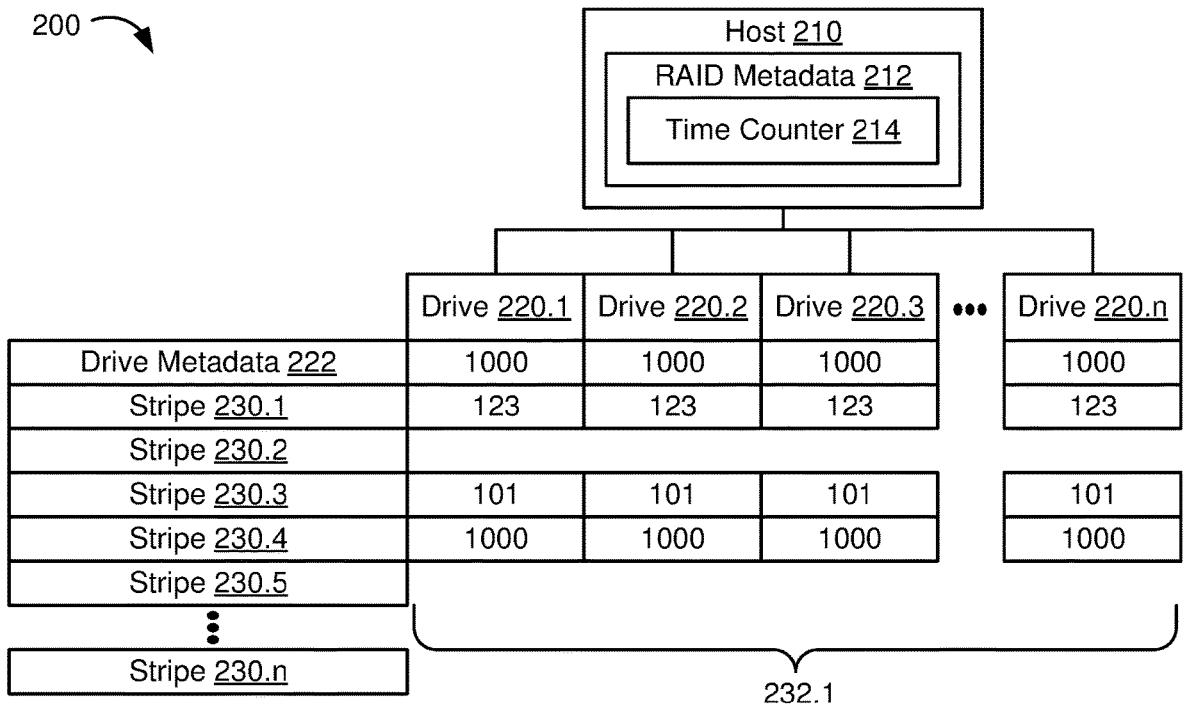
FIG. 2a schematically illustrates the use of block time values at a first time before a storage device interruption.
Figure 2B:
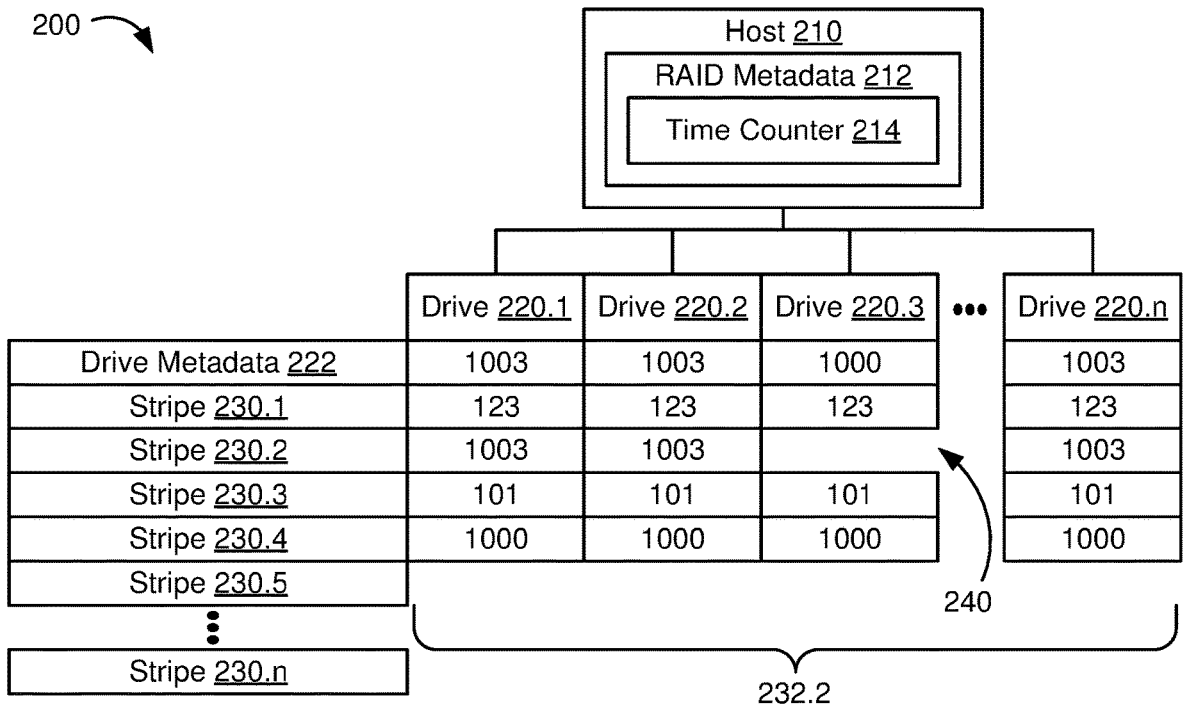
FIG. 2b schematically illustrates the use of block time values at a second time after a storage device interruption.

FIGS. 2*a* and 2*b* show schematic representations of the use of block time values for determining incomplete RAID stripes. FIG. 2*a* shows the state of storage system 200 at a first time prior to an operating interruption. FIG. 2*b* shows the state of storage system 200 at a second time after an operating interruption has occurred, the RAID set has entered a degraded state, and the RAID stripes for a partial rebuild need to be determined. In some embodiments, storage system 200 may be configured similarly to data storage system 100 in FIG. 1, but with the RAID controller implemented at the host level, e.g., in host 210, and the data storage devices being implemented in drives 220 (e.g., HDDs or SSDs).

Determining the incomplete RAID stripes for a partial rebuild may enable faster reconstruction (reconstruction of only out-of-sync sectors) by storing block time values in system data bytes for each RAID block or sector in drives 220.1-220.*n*. For example, block time values may be stored using specially formatted drives, such as protection information (PI) formatted drives, that include system data bytes drive beyond the user's 512 byte data of the sector (e.g., 520 or 528 byte sectors, etc.). A similar strategy may apply for 4K drives or other drive formatting with additional per block system space. The system space for each sector/block may be used to store counter information for a better rebuild process. In some embodiments, the system space may support multiple system features, such as both the data integrity field for PI and the block time value for counter information. In FIGS. 2*a* and 2*b*, only block time values 323.1 and 232.2 are shown and each block time value would be stored with the corresponding host data block (including parity blocks) in the respective drives 220 for stripes 230. Additional stripes 230.5-230.*n* are shown to illustrate that any number of stripes may be written to the RAID set and the corresponding block time values are omitted for brevity. Note that stripe order in FIGS. 2*a* and 2*b* does not necessarily correspond to the order in which the stripes are written and/or updated.

Host 210 may be configured to maintain a time counter 214 with a defined granularity, generally a time window greater than the normal clock or timestamp increments, such as one minute. Use of larger time granularities reduces write-time overhead for tracking and storing time counter 214, but may trade-off the number of out-of-sync or unknown stripes resulting from any given interruption. The host writes the host data in RAID blocks in the sector of each drive, along with time counter in the system space. For each full RAID stripe, all the sectors within the stripe would have the same or similar time counter. For example, each block time value for stripe 230.1 is 123, stripe 230.3 is 101, and stripe 230.4 is 1000. In some embodiments, the granularity value is set such that multiple RAID stripes may be written within the window of each time counter value. For example, multiple stripes may be written at time counter 101, 123, and 1000. Periodically, such as at each increment based on the granularity value, host 210 may update the host time counter in RAID metadata 212.

At a first time in FIG. 2a, block time values 232.1 indicate stripe/sector writing over time. The latest (last or most recent) write has happened on stripe 230.4 with time counter (TC) 1000. In some embodiments, the most recent time counter value (block time value) may be periodically written to drive metadata 222 in each drive 220 to assist with quickly identifying the last time window in which the drive has completed assigned block writes.

In FIG. 2b, at a second point in time after the first time, drive 220.3 goes offline for a short period and comes back. Within this offline time, only stripe 230.2 gets updated. When drive 220.3 comes back online, host 210 may use metadata (e.g., block time values) to determine which RAID stripes are incomplete or out-of-sync and update only those stripes. In FIG. 2b, host 210 may determine the last block written to interrupted drive 220.3 was stripe 230.4 with a block time value of 1000 (corresponding to the time counter during which the block was written). Therefore, any stripes written at time counters greater than 1000 are incomplete, because drive 220.3 did not participate (or cannot be guaranteed to have participated) in writing its allocated blocks. Host 210 may scan block time values for any of the drives that were not interrupted (uninterrupted drives 220.1, 220.2, 220.n) to identify stipes that have blocks written at higher time counter values. In FIG. 2b, stripe 230.2 was written or updated at time counter 1003 and drive 220.3 is out-of-sync at the missing block 240.

Host 210 may check the time counter value for each stripe (based on the block time values for an uninterrupted drive) and determine the list of incomplete stripes for rebuild to bring drive 220.3 back into synchronization with the other drives. For example, the RAID data successfully stored on uninterrupted drives 220.1, 220.2, and 220.n may be used to calculate the host and/or parity data for missing block 240 and then the reconstructed data may be stored to the originally allocated block in drive 220.3 to complete stripe 230.2. Reconstructing only the desynchronized stripes may reduce the time spent in the degraded state and prevent complete rebuild.

Figure 3:
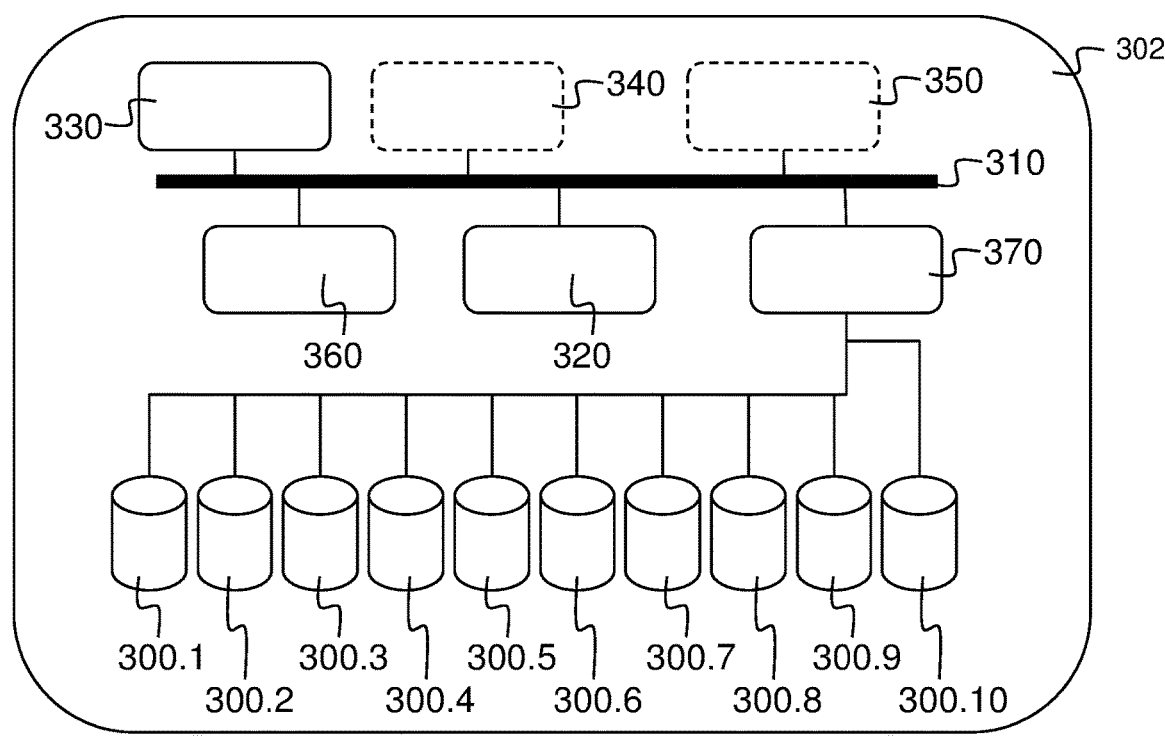
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) SATA-II disk drives or 2 TB NVMe solid state drives (SSDs), and control the reading and writing of data to/from these storage elements 300. As shown in FIG. 3, such a storage node 302 could comprise ten 2 TB SATA-II disk drives as storage elements 300.1-300.10 and in this way storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows any suitable mix of types of storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
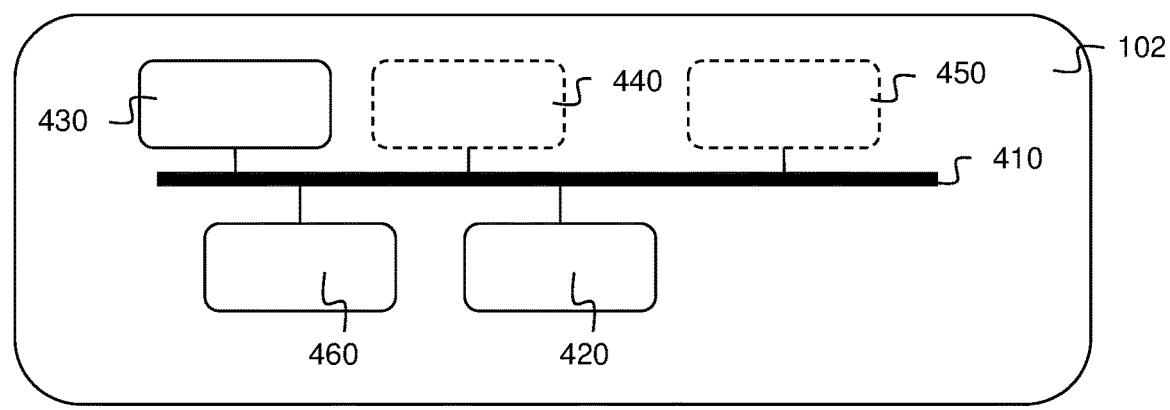
FIG. 4 schematically illustrates a host or controller node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
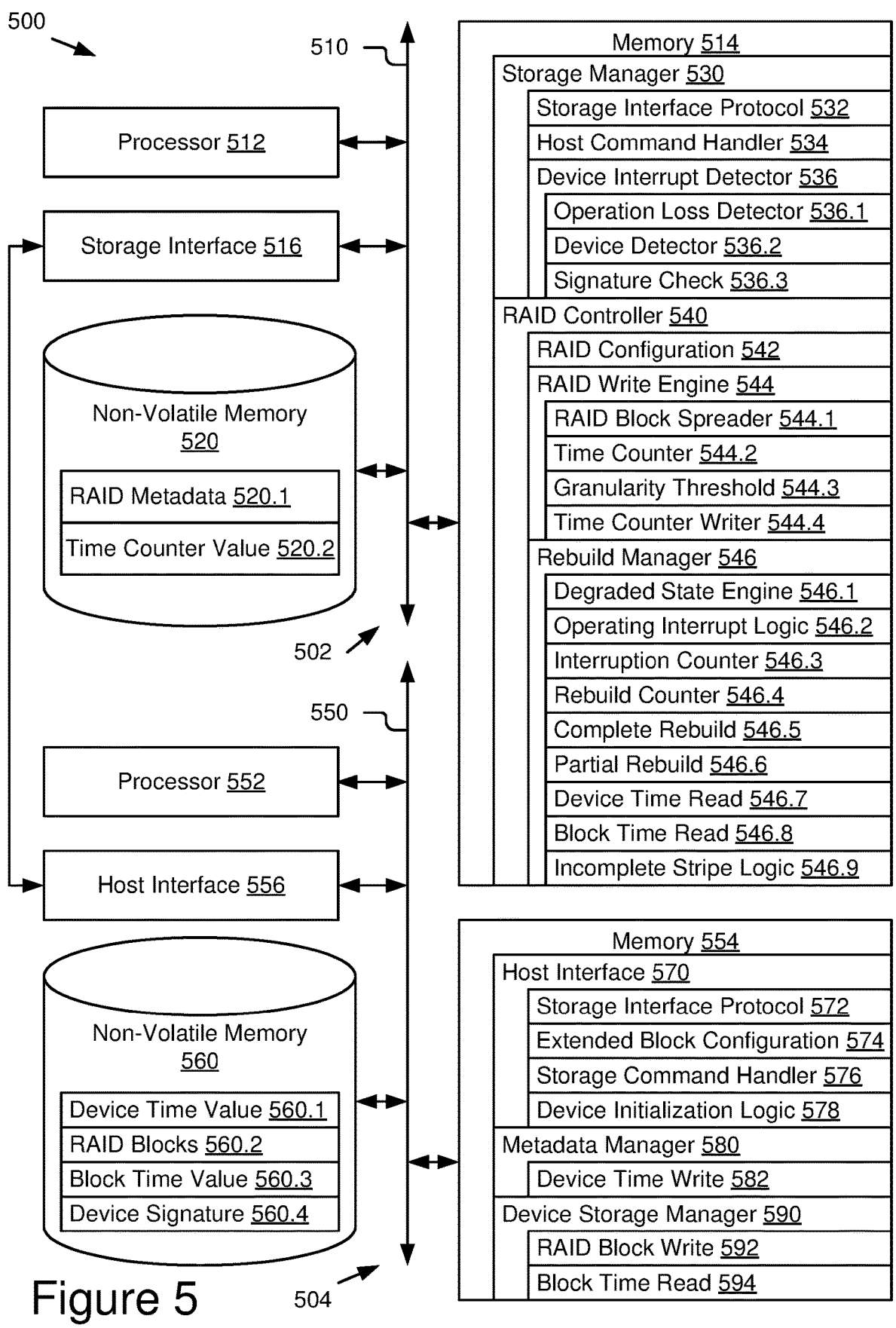
FIG. 5 schematically illustrates some elements of the storage system of FIGS. 1-4 in more detail.

FIG. 5 schematically shows selected modules of a storage system 500 configured for selective rebuild of interrupted storage devices. Storage system 500 may incorporate elements and configurations similar to those shown in FIGS. 1-4. In the configuration shown, a controller 502 is configured to execute RAID controller functions. For example, controller 502 may be embodied in a host system, storage controller, dedicated RAID controller, or another device configured to manage RAID block allocation and recovery for a set of data storage devices configured in a RAID set. In some embodiments, the components and functions of controller 502 may be divided among multiple systems, such as separate RAID write and RAID rebuild systems. Data storage device 504 provides an example storage device or drive configuration for storage system 500. Multiple instances of data storage device 504 may be present in storage system 500 and may generally correspond to the number of data storage devices in the RAID set for a given implementation.

Controller 502 and data storage device 504 may each include at least one bus 510, 550 interconnecting at least one processor 512, 552, at least one memory 514, 554, and at least one interface, such as storage interface 516 and host interface 556. Bus 510, 550 may include one or more conductors that permit communication among the components of controller 502 and data storage device 504 respectively. Processor 512, 552 may include any type of processor or microprocessor that interprets and executes instructions or operations. Memory 514, 554 may include a random access memory (RAM) or another type of dynamic storage device that stores information and instructions for execution by processor 512, 552 and/or a read only memory (ROM) or another type of static storage device that stores static information and instructions for use by processor 512, 552 and/or any suitable storage element such as a hard disk or a solid state storage element.

Storage interface 516 and host interface 556 may include physical interfaces for connecting controller 502 to one or more data storage devices 504 using an interface protocol that supports storage device access. For example, storage interface 516 and host interface 556 may each include a PCIe or similar storage interface connector supporting NVMe access to solid state media comprising non-volatile memory devices 560. As described above, other network and/or peripheral interface standards may be used for storage interface 516 and host interface 556.

Controller 502 and data storage device 504 may each include one or more non-volatile memory devices 520, 560 or similar storage elements. For example, non-volatile memory devices 520 may include onboard flash memory and/or data storage devices configured to provide system and metadata storage for controller 502 and non-volatile memory devices 560 may include flash memory packages of an SSD, magnetic disk subsystem (e.g., read/write channel, servo control, heads, and media) of an HDD, or other non-volatile memory system organized as an addressable memory array. In some embodiments, non-volatile memory devices 520, 560 may include NAND or NOR flash memory devices comprised of single level cells (SLC), multiple level cell (MLC), triple-level cells, quad-level cells, etc.

Controller 502 may include a plurality of modules or subsystems that are stored and/or instantiated in memory 514 for execution by processor 512 as instructions or operations. For example, memory 514 may include a storage manager 530 configured to receive host commands and manage corresponding read, write, and other operations to data storage devices, such as data storage device 504. Memory 514 may include a RAID controller 540 configured to manage RAID write operations, RAID metadata, and RAID rebuild operations involving a plurality of data storage devices configured in a RAID set, including data storage device 304.

Storage manager 530 may include interface protocols and/or functions and parameters for receiving, parsing, responding to, and otherwise managing requests from host nodes or systems (or generated from other applications running on a system that includes controller 502) for a plurality of data storage devices configured in a RAID set managed by RAID controller 540. For example, storage manager 530 may include functions for receiving and processing host storage requests for reading, writing, modifying, or otherwise manipulating data blocks and their respective client or host data and/or metadata in accordance with host communication and storage protocols. In some embodiments, storage manager 530 may also include functions for managing data storage device initialization, configuration, power management, and/or other data storage device management features.

In some embodiments, storage manager 530 may include a plurality of hardware and/or software modules configured to use processor 512 and memory 514 to handle or manage defined operations of storage manager 530. For example, storage manager 530 may include a storage interface protocol 532 configured to comply with the physical, transport, and storage application protocols supported by the host and/or data storage devices for communication over storage interface 516. Storage manager 530 may include a host command handler 534 configured to receive host storage commands and determine corresponding storage commands or operations to be executed against the data storage devices. Host command handler 534 may invoke RAID controller 540 for write, delete, and other operations that impact host data stored according to a RAID configuration. Storage manager 530 may include a device interrupt detector configured to determine when operations to one or more data storage devices are interrupted.

In some embodiments, storage interface protocol 532 may support one or more standards for compliant communication, command, and syntax functions, procedures, and data structures. For example, storage interface protocol 532 may support PCIe, SATA, small computer peripheral interface (SCSI), serial attached SCSI (SAS), fibre channel (FC), universal serial bus (USB), and/or network attached storage interfaces and may support higher-level storage protocols, such as NVMe and RDMA, and/or network protocols, such as transmission control protocol/internet protocol (TCP/IP). In some embodiments, storage interface protocol 532 may assure that controller 502 is compliant with host request, command, and response syntax for interacting with data storage device 504 over storage interface 516 and host interface 556.

In some embodiments, host command handler 534 may include interfaces, functions, parameters, and/or data structures to handle storage requests directed to the data storage devices. For example, a host or application may send any number of storage commands targeting data stored in the RAID set of data storage devices to controller 502. Host command handler 534 may parse and validate the incoming storage commands and then pass the storage command to a storage command processor. In some embodiments, host command handler 534 may pass storage commands targeting data stored in or to be stored in the RAID set to RAID controller 540. Host command handler 534 may also maintain return paths for responses from the storage commands that may then be returned to the requesting host or host application.

Device interrupt detector 536 may include interfaces, functions, parameters, and/or data structures for managing storage interface connections with the storage devices in the RAID set and determining when an operating connection with one or more of the storage devices is lost. For example, device interrupt detector 536 may monitor a communication and/or power connection with each storage device and/or receive status or error messages related to commands or other communications with each storage device. In some embodiments, an operation loss detector 536.1 may be configured to determine a communication or operation loss state for a storage device. For example, operation loss detector 536.1 may use a power signal, communication ping, command error monitor, or other indicator of loss of operation to determine when connection with a storage device has been lost. In some embodiments, the loss of operation of any storage device may generate a state or error indicator that is passed to RAID controller 540 and/or other system components indicating that a storage device is no longer responding or available for storage operations. For example, the loss of operation may trigger a degraded state for the RAID set in response to a potential failure of one of the storage devices.

In some embodiments, device detector 536.2 may be an interface function for detecting the presence of a data storage device. For example, a lost storage device may be associated with a particular slot, bay, interface connection, or other physical connection and device detector 536.2 may monitor the physical connection for initialization, handshake, or other indicator that a new storage device has been connected in the same position. The appearance of a storage device may trigger a verification process to determine the identity, configuration, and/or other information regarding the new storage device. For example, upon power up, initialization, or connection of a storage device, signature check 536.3 may be executed by reading a device signature 560.4 stored in the storage device to determine a unique identifier or signature of that storage device. In some embodiments, signature check 536.3 may compare the signature of the new storage device to the signature of the storage device with which the connection was lost to determine whether they are the same data storage device. If the signatures of the two storage devices match, then device interrupt detector 536 may determine that a device interrupt has occurred and communicate the device interrupt to RAID controller 540 to determine whether the reconnection of the same device may allow a partial rebuild to correct the degraded state of the RAID set. If the signatures of the two storage devices do not match, then device interrupt detector 536 may determine that a replacement device has been provided and communicate the presence of the replacement device to RAID controller for a complete rebuild.

RAID controller 540 may include an interface protocol and/or set of functions and parameters for reading, writing, and deleting data units in one or more RAID configurations in the data storage devices connected to controller 502, such as data storage device 504. In addition, RAID controller 540 may include functions for disabling storage operations to a RAID set that has entered a degraded state and for performing partial or complete rebuilds to place the RAID set back into normal operation. RAID controller 540 may include functions for executing host data operations related to host storage commands received through host command handler 534. For example, PUT or write commands may be configured to write host data units to RAID set. GET or read commands may be configured to read data from the RAID set. DELETE commands may be configured to delete data from the RAID set, or at least mark a data location for deletion until a future garbage collection or similar operation actually deletes the data or reallocates the physical storage location to another purpose. In some embodiments, RAID controller 540 may be configured allocate host storage commands to provide redundant storage among the data storage devices in the RAID set. For example, host data blocks may be written, aggregated, or divided into RAID blocks and parity calculations made to generate one or more additional parity blocks to generate and store a RAID stripe capable of reconstructing data (up to a defined level of failed storage devices and/or corresponding lost RAID blocks).

In some embodiments, RAID controller 540 may include a plurality of hardware and/or software modules configured to use processor 512 and memory 514 to handle or manage defined operations of RAID controller 540. For example, RAID controller 540 may include a RAID configuration 542 configured to define one or more RAID sets, RAID levels, and other parameters defining the operation of the RAID storage and rebuild processes. RAID controller 540 may include a RAID write engine 544 configured to write RAID data blocks for each RAID stripe to the RAID set of data storage devices. RAID controller 540 may include a rebuild manager 546 configured to execute partial or complete rebuilds to recover the host data in the RAID set following a data loss (or possible data loss).

RAID configuration 542 may include interfaces, functions, parameters, and/or data structures to define a specific RAID configuration for one or more RAID sets managed by RAID controller 540. For example. RAID configuration 542 may be embodied in a configuration file, page, table, or similar data structure that provides a set of RAID configuration parameters for a particular RAID set. In some embodiments, the RAID configuration parameters may include a number of storage devices, unique identifiers (such as storage device signature values) for each storage device, capacity and/or other technical specifications for each storage device, RAID level (RAID 4, RAID 5, RAID 6, etc.), parity parameters, RAID metadata parameters, rebuild parameters, etc. In some embodiments, one or more RAID configuration parameters may be user configurable through a command line or administrative interface. User configurable RAID configuration parameters may include one or more parameters specifically related to the partial rebuild of interrupted data storage devices. For example, granularity threshold 544.3, interruption and/or rebuild thresholds for rebuild manager 546, enabling or disabling storage of device time value 560.1 in each storage device, etc. may be user configurable parameters as further discussed below.

RAID write engine 544 may include interfaces, functions, parameters, and/or data structures to manage how host data is sent to the storage devices in the RAID set. For example, host storage commands to write to or update host data blocks in the RAID set may be parsed and allocated in RAID data blocks for storage in the storage device. In some embodiments, RAID write engine 544 may include one or more algorithms and related buffers for receiving, aggregating, dividing, and/or otherwise allocating host data into a set of RAID blocks that include host data and corresponding parity data. For new RAID stripes, RAID block spreader 544.1 may determine which RAID blocks are written to which storage devices in the RAID set for each RAID stripe. For example, RAID block spreader 544.1 may be configured to distribute parity blocks across storage devices in a RAID 5 or RAID 6 configuration. RAID write engine 544 may be configured to execute a write or put command to each storage device for their respective RAID blocks allocated by RAID block spreader 544.1.

In some embodiments, RAID write engine 544 may include a time counter 544.2 configured to determine time intervals for writing RAID stripes and appending block time values to each RAID block as it is written. For example, time counter 544.2 may include a time counter value that is periodically incremented to provide a uniform time value that may be written by time counter writer 544.4 with each RAID data block. In some embodiments, the increment of time counter 544.2 may be based on a clock time associated with RAID controller 540 and/or controller 502. In some embodiments, a granularity threshold 544.3 may be configured to provide time increments that are greater than clock time increments and reduce the frequency with which time counter 544.2 changes. For example, granularity threshold 544.3 may include a configurable time parameter, such as every 10 seconds or every minute. In an alternate embodiment, granularity threshold 544.3 may be based on other values, such as a number of RAID stripes written (e.g., every 5 RAID stripes), time increment since a last RAID stripe was written (5 seconds from the time the last set of RAID block writes were sent to the storage devices), following the receipt of write responses for each RAID data block in a prior RAID stripe, or other event and/or time-based triggers. In some embodiments, a user may configure granularity threshold 544.3, such as selection of a time increment or set of logical rules for incrementing time counter 544.2. In some embodiments, time counter values may include time values corresponding to a clock time when the time counter 544.2 was incremented, an ordinal count value that is incremented for each granularity threshold passed, or other ordered sets of values that enable RAID controller to determine sets of RAID stripes written during distinct (and ordered) time windows. In some embodiments, time counter 544.2 may periodically store, such as after each increment, the current time counter value as time counter value 520.2 in non-volatile memory 520. For example, time counter value 520.2 may be written to RAID metadata 520.1 as a parameter value and/or written to corresponding entries for each RAID stripe written during the corresponding time window of time counter 544.2. In some embodiments, the time counter value may periodically be written to the metadata of each data storage device in the RAID set as device time value 560.1 to maintain state information for the most recent block time values received by that data storage device.

In some embodiments, time counter writer 544.4 may write the time counter value for the present time window with each RAID block and to each storage device in the RAID set. For example, the current time counter value from time counter 544.2 may be appended to each RAID data block to be written to the non-volatile memory of the destination storage device with that RAID block (e.g., in continuous storage locations in non-volatile memory 560) in an atomic write operation. In some embodiments, the data storage devices may be formatted for an extended block format that provides additional system storage locations in the write block and time counter writer 544.4 may include the time counter value as a block time value (e.g., block time value 560.3) in the same write block and write operation as the RAID data block. Time counter writer 544.4 may be configured to write the time counter value as a block time value to each storage device without requiring a separate operation, such as a metadata operation, that could be executed or interrupted separate from successful write of the RAID data block. In some embodiments, time counter writer 544.4 may assure that each RAID data block successfully written to each data storage device may necessarily be accompanied by a block time value reflecting the time window in which the write commands were issued by RAID write engine 544.

Rebuild manager 546 may include interfaces, functions, parameters, and/or data structures configured to determine and execute complete or partial rebuilds of a RAID set in response to one or more data storage devices becoming unresponsive. For example, RAID controller 540 may determine, such as based on an indicator from device interrupt detector 536, that operation of a storage device has been interrupted, indicating that one or more RAID stripes may not have been successfully stored and the RAID set may be compromised for storing additional host data with the desired redundancy. In some embodiments, rebuild manager 546 may include a degraded state engine 546.1 comprising logic for determining when the RAID set should be placed in a degraded state, such that new storage operations are not executed against it until it leaves the degraded state and returns to normal operation. For example, degraded state engine 546.1 may monitor storage device state information and/or error conditions from device interrupt detector 536, other components of RAID controller 540 (e.g., RAID write engine 544), a read engine, and/or other functions that may detect an unresponsive data storage device.

In some embodiments, rebuild manager 546 may include operating interrupt logic 546.2 configured to determine an operating interrupt, as opposed to complete (or extended) loss of a storage device. For example, operating interrupt logic 546.2 may receive notifications, events, and/or state information from device interrupt detector 536.1 relating to the loss of operation of one or more storage devices, such as responsive to and/or during a degraded state. Operating interrupt logic 546.2 may include a plurality of logical rules that may be evaluated to determine whether an operating interrupt event has occurred, identify the interrupted storage device, and determine whether a complete or partial rebuild should be triggered. In some embodiments, an interruption counter 546.3 may be used to determine an elapsed time since operating contact with a storage device was lost. For example, interruption counter 546.3 may measure the elapsed time and compare the time to an interruption threshold. If the elapsed time value of interruption counter 546.3 exceeds the interruption threshold before the storage device returns to operation, then the operating loss may be treated as complete and, when the storage device returns to operation or is replaced with a replacement storage device, complete rebuild 546.5 may be triggered.

In some embodiments, a rebuild counter 546.4 may be used to determine a number of incomplete RAID stripes created by an operating interrupt. For example, rebuild counter 546.4 may count the number of incomplete RAID stripes determined using the block time values and time counter comparisons and compare the count to a complete rebuild threshold. If the count meets or exceeds the complete rebuild threshold, then complete rebuild threshold 546.5 may be triggered. If, after the interruption is complete, the count does not meet or exceed the complete rebuild threshold, partial rebuild 546.6 may be triggered. Complete rebuild 546.5 may be configured to assume that all RAID stripes previously written in the RAID set may have lost the data contained in one or more (depending on the RAID configuration and number of interrupted storage devices) storage devices and every RAID stripe in the RAID set may be queued for a rebuild process based on the RAID blocks in the remaining storage devices. Partial rebuild 546.6 may be configured to assume that only the incomplete or out-of-sync RAID stripes from the operating interrupt may have lost data and only those incomplete RAID stripes may be queued for the rebuild process. In either case, for each RAID stripe in the rebuild queue, the synchronized RAID blocks (including one or more parity blocks) may be used to rebuild or calculate replacement RAID blocks for the missing or out-of-sync RAID blocks of the interrupted storage device(s).

In some embodiments, rebuild manager 546 may be configured to use a difference between the block time values of the RAID blocks in the interrupted storage device and at least one uninterrupted storage device to determine which RAID stripes should be identified as incomplete RAID stripes. For example, the last RAID block successfully written to the interrupted storage device may be determined from the block time values stored with the RAID blocks in the storage device and that block time value may correspond to the last time counter value when the storage device was processing commands. The most recent, latest, or last block time value written to the interrupted storage device may determine the last complete RAID stripe and rebuild manager 546 may use that time counter value and each RAID stripe with a higher time counter value to identify incomplete RAID stripes. In some embodiments, rebuild manager 546 may include a device time read 546.7 configured to read the device time value 560.1 for at least one uninterrupted storage device to determine the last RAID stripe or set of RAID stripes written to the uninterrupted storage devices. In some embodiments, rebuild manager 546 may include a block time read 546.8 configured to read block time value 560.3 for each RAID block in a data storage device to determine the most recent or highest block time value and/or determine the RAID stripes with block time values equal to or greater than a selected time counter value. For example, block time read 546.8 may read block time value 560.3 for each RAID block stored in the interrupted data storage device to determine the last RAID stripe (or stripes) written and corresponding time counter value. Incomplete stripe logic 546.9 may be configured to use the time counter values from block time values, device time values, and/or RAID metadata to determine the incomplete or out-of-sync RAID stripes for partial rebuild 546.6. For example, incomplete stripe logic 546.9 may use a last block time value from the interrupted storage device as a last valid RAID stripe value and compare it to block time values read from at least one uninterrupted storage device to determine the incomplete RAID stripes. In some embodiments, the time counter value from the last block time value in the interrupted storage device may be compared to time counter values in RAID metadata 520.1 and/or read from device time values 560.1 to determine the incomplete RAID stripes. For example, RAID metadata 520.1 may include entries for each RAID stripe that includes time counter value 520.2 for the RAID stripes written during that time window and the last block time value may be used as an index for determining that all RAID stripe entries with time counters greater than (or equal to) the last block time value may be incomplete RAID stripes and should be rebuilt.

Example data storage device 504 may include a plurality of modules or subsystems that are stored and/or instantiated in memory 554 for execution by processor 552 as instructions or operations. For example, memory 554 may include a host interface 570 configured to receive host commands and manage corresponding read, write, and other operations executed against non-volatile memory 560 and corresponding host data and metadata. Memory 554 may include a metadata manager 580 configured to manage metadata stored in data storage device 504. Memory 554 may include a device storage manager 590 configured to manage host and system data written to and read from non-volatile memory 560.

Host interface 570 may include interface protocols and/or functions and parameters for receiving, parsing, responding to, and otherwise managing requests from host nodes or systems (directly or through one or more storage controllers, such as controller 502). For example, host interface 570 may include functions for receiving and processing storage requests for reading, writing, modifying, or otherwise manipulating data blocks and their respective client or host data and/or metadata in accordance with host communication and storage protocols.

In some embodiments, host interface 570 may include a plurality of hardware and/or software modules configured to use processor 552 and memory 554 to handle or manage defined operations of host interface 570. For example, host interface 570 may include a storage interface protocol 572 configured to comply with the physical, transport, and storage application protocols supported by the host for communication over storage interface 556. In some embodiments, storage interface protocol 572 may be configured similarly to storage interface protocol 532, but for the storage device role. Host interface 570 may include an extended block configuration 574 to configured data storage device 504 as described above with regard to storage devices 120 in FIG. 1. Host interface 570 may include a storage command handler 576 configured to receive storage commands or operations from controller 502 and determine corresponding storage operations to be executed against non-volatile memory 560. For example, storage command handler 576 may receive and parse read, write, delete, and other commands from controller 502 and direct corresponding operations to metadata manager 580 and storage manager 590. Host interface 570 may include device initialization logic 578 configured to manage device power cycles and initiate communication (according to storage interface protocol 572) with controller 502 at startup or other initialization events. For example, device initialization logic 578 may send an initialization message to controller 502 that includes device signature 560.4 and/or other storage device metadata for establishing or reestablishing operating communications with controller 502.

Metadata manager 580 may include interface protocols and/or functions and parameters for managing metadata stored in data storage device 504, such as FTL data or sector mapping information, device parameters, and other system information. For example, metadata manager 580 may include functions for defining and managing metadata tables, pages, or other data structures in system areas of non-volatile memory 560. In some embodiments, metadata manager 580 may include a plurality of hardware and/or software modules configured to use processor 552 and memory 554 to handle or manage defined operations of metadata manager 580. For example, metadata manager 580 may include a device time write 582 configured to write a time counter value for a defined operating window (and corresponding RAID stripes/blocks) as device time value 560.1 in storage device metadata. The time value for device time value 560.1 may be received in a metadata write command from controller 502 and stored in a memory location designated for the most recent device time value. A corresponding read operation may be configured to return device time value 560.1 to controller 502 upon request.

Device storage manager 590 may include interface protocols and/or functions and parameters for managing data stored to non-volatile memory 560, such as host/RAID data blocks to host storage locations and system data to system storage locations. For example, device storage manager 590 may be configured to execute write and read operations against non-volatile memory 560 based on host LBA designations and corresponding memory locations or sectors that make up non-volatile memory 560 using the read and write paths of data storage device 304. In some embodiments, device storage manager 590 may include a plurality of hardware and/or software modules configured to use processor 552 and memory 554 to handle or manage defined operations of device storage manager 590. For example, device storage manager 590 may include a RAID block write 592 configured to execute RAID block writes based on the commands received from RAID write engine 544, including writing each block time value 560.3 adjacent each RAID block 560.2 as part of an atomic write operation. For example, device storage manager 590 may include a block time read 594 configured to execute block time reads based on commands received from rebuild manager 546, including reading block time value 560.3 for each RAID block 560.2.

Figure 6:
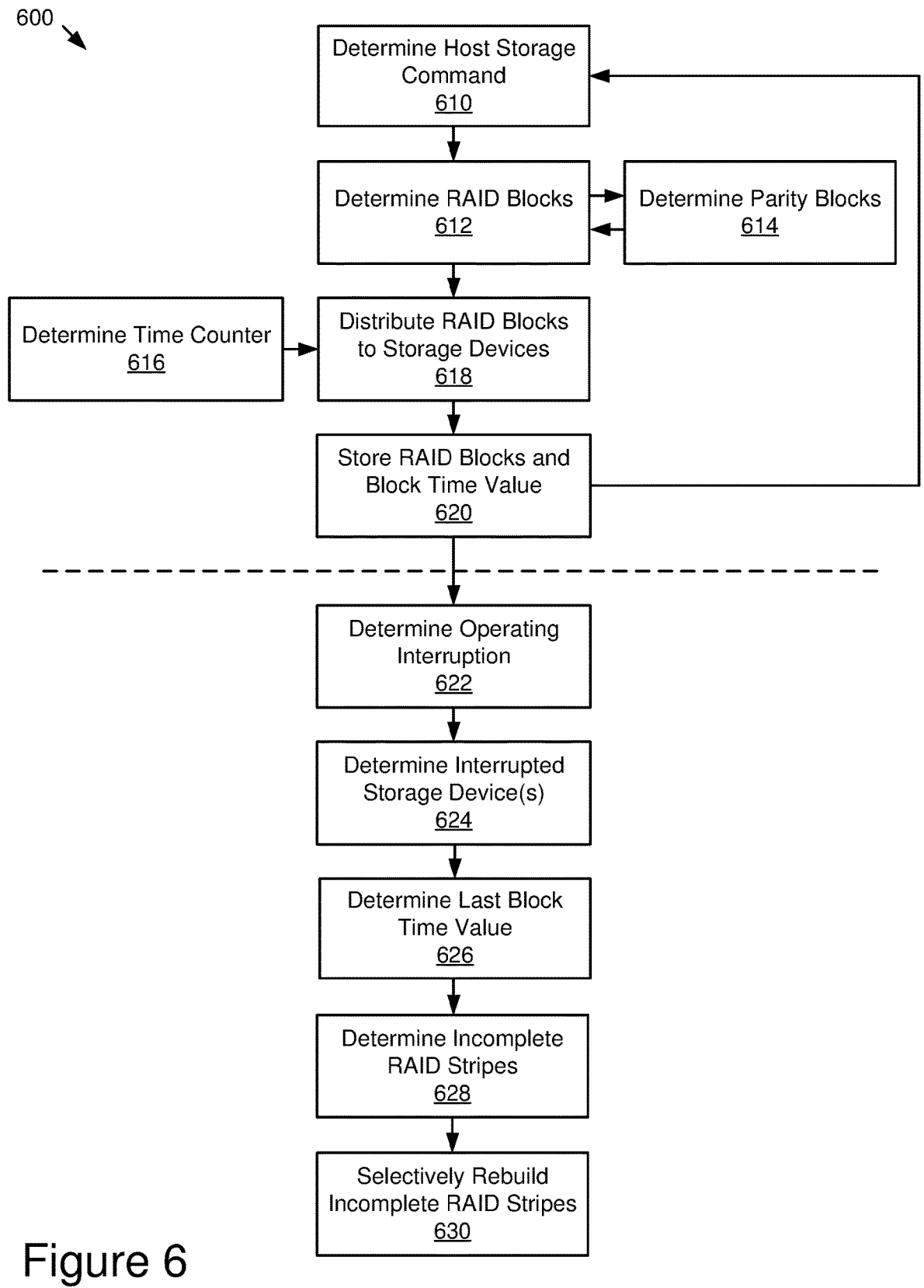
FIG. 6 is a flowchart of an example method of storing RAID block time values and using them to selectively rebuild incomplete RAID stripes.

As shown in FIG. 6, storage system 500 may be operated according to an example method for storing RAID block time values and using them to selectively rebuild incomplete RAID stripes, i.e., according to method 600 illustrated by blocks 610-630 in FIG. 6.

At block 610, a host storage command may be determined. For example, a controller may receive a host storage command to store or modify one or more host data blocks in a RAID set of data storage devices managed by the controller.

At block 612, RAID blocks may be determined for storing the host data. For example, the controller my divide the host data into a plurality of RAID blocks.

At block 614, one or more parity blocks may be determined from the host data. For example, based on the RAID configuration, the controller may calculate at least one parity block for the set of RAID blocks containing the host data and add the parity block to the set of RAID blocks that make up the corresponding RAID stripe.

At block 616, a time counter may be determined for the RAID stripe. For example, the controller may include a time counter that is incremented to provide regular intervals or time windows during which RAID stripes may be grouped by a particular time counter value.

At block 618, the RAID blocks may be distributed to the storage devices in the RAID set. For example, for each RAID stripe, a RAID block may be sent to each storage device in the RAID set, along with the current time counter value as a block time value.

At block 620, the RAID blocks and their corresponding block time values may be stored to the storage devices. For example, each data storage device may receive a write command from the controller that includes its allocated RAID block and block time value and store the RAID block with the block time value in non-volatile memory.

Blocks 610 through 620 may repeat any number of times for a plurality of host storage commands and incrementing time counter values during normal operation of the RAID set. When one or more storage devices in the RAID set suffer a loss of operation or communication with the controller, method 600 may proceed to block 622.

At block 622, an operating interruption may be determined. For example, the controller may determine that communication with and/or operating status of a storage device is lost, interrupting operations and triggering a degraded state for the RAID set.

At block 624, at least one interrupted storage device may be determined. For example, the controller may determine an operation loss and a return of the same storage device, identifying the storage device as interrupted (rather than replaced).

At block 626, a last block time value for the interrupted storage device may be determined. For example, the controller may read the block time values stored with the RAID blocks in the interrupted storage device to determine the last or most recent block time value and corresponding RAID block.

At block 628, at least one incomplete RAID stripe may be determined. For example, the controller my use the last block time value to identify all RAID stripes written to an uninterrupted storage device (e.g., those having a greater time counter value) and for which the corresponding RAID block was not written or updated to the interrupted storage device. The set of incomplete RAID stripes may include all RAID stripes written in time intervals with greater time counter values than the last block time value.

At block 630, the incomplete RAID stripes may be selectively rebuilt. For example, the controller may add the set of incomplete RAID stripes determined at block 628 to a rebuild queue and exclude RAID stripes with time counter values less than the last block time value, as they were successfully written before the operating interruption.

Figure 7:
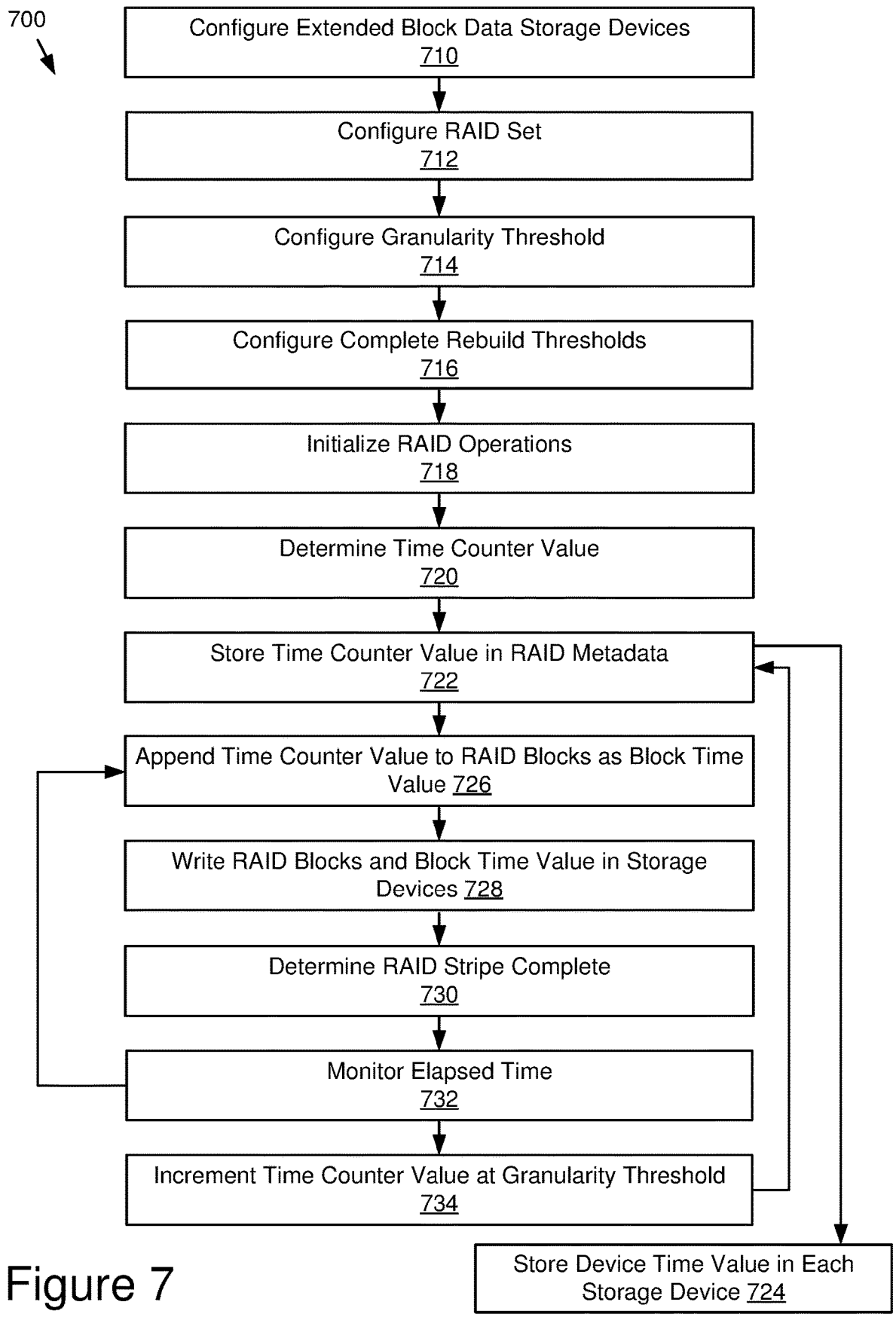
FIG. 7 is a flowchart of an example method of storing RAID block time values in a RAID set of data storage devices.

As shown in FIG. 7, storage system 500 may be operated according to an example method for storing RAID block time values in a RAID set of data storage devices, i.e., according to method 700 illustrated by blocks 710-734 in FIG. 7.

At block 710, extended block data storage devices may be configured. For example, the controller or another configuration utility may format each data storage device in the RAID set as an extended block storage device with system storage locations appended to each host data location.

At block 712, a set of data storage devices may be configured as a RAID set. For example, the controller may configure a RAID set comprised of a defined number of data storage devices complying with a desired RAID configuration in terms of redundancy and allowable storage device failures from which the host data may be recovered.

At block 714, a granularity threshold may be configured. For example, the controller may include a configurable granularity threshold value that is stored in RAID configuration parameters and may be determined by a system default value or a user or administrator input.

At block 716, one or more complete rebuild thresholds may be configured. For example, the controller may include configurable interruption thresholds and/or rebuild thresholds that are stored in the RAID configuration parameters for determining, based on elapsed time or a number of incomplete RAID stripes, whether to initiate a complete rebuild or a partial rebuild.

At block 718, RAID operations may be initialized. For example, the controller may initialize the data storage devices in the RAID set and begin receiving host storage operations or commands directed to the RAID set.

At block 720, a time counter value may be determined. For example, the controller may initialize a time counter used to track operating time windows during which one or more RAID stripes may be written to the RAID set.

At block 722, the time counter value may be stored in RAID metadata. For example, the controller may store the time counter in RAID metadata at the start of each operating window.

At block 724, the time counter value may be stored in each data storage device in the RAID set as a device time value. For example, the controller may use a metadata write command to store the current time counter value in the metadata of each data storage device in the RAID set.

At block 726, the time counter value may be appended to each RAID block as a block time value. For example, the controller may add the time counter value in a block time value location in the system storage locations of the extended block format configured at block 710.

At block 728, the RAID blocks, including the block time values, may be written to the data storage devices. For example, the controller may send a write command for a RAID data block that includes the appended block time value in the same write command and atomic write operation.

At block 730, a complete RAID stripe may be determined. For example, the controller may receive notification from each data storage device after the RAID block (and block time value) are successfully stored.

At block 732, an elapsed time may be monitored. For example, the controller may monitor an elapsed time since the current time counter value was determined and corresponding RAID write operations were initiated.

At block 734, the time counter value may be incremented according to the granularity threshold. For example, when the elapsed time monitored at block 732 meets the granularity threshold, the time counter value may be incremented and the new time counter value may be used for RAID operations, returning to block 722 with a new current time counter value for a next set of RAID stripes.

Figure 8:
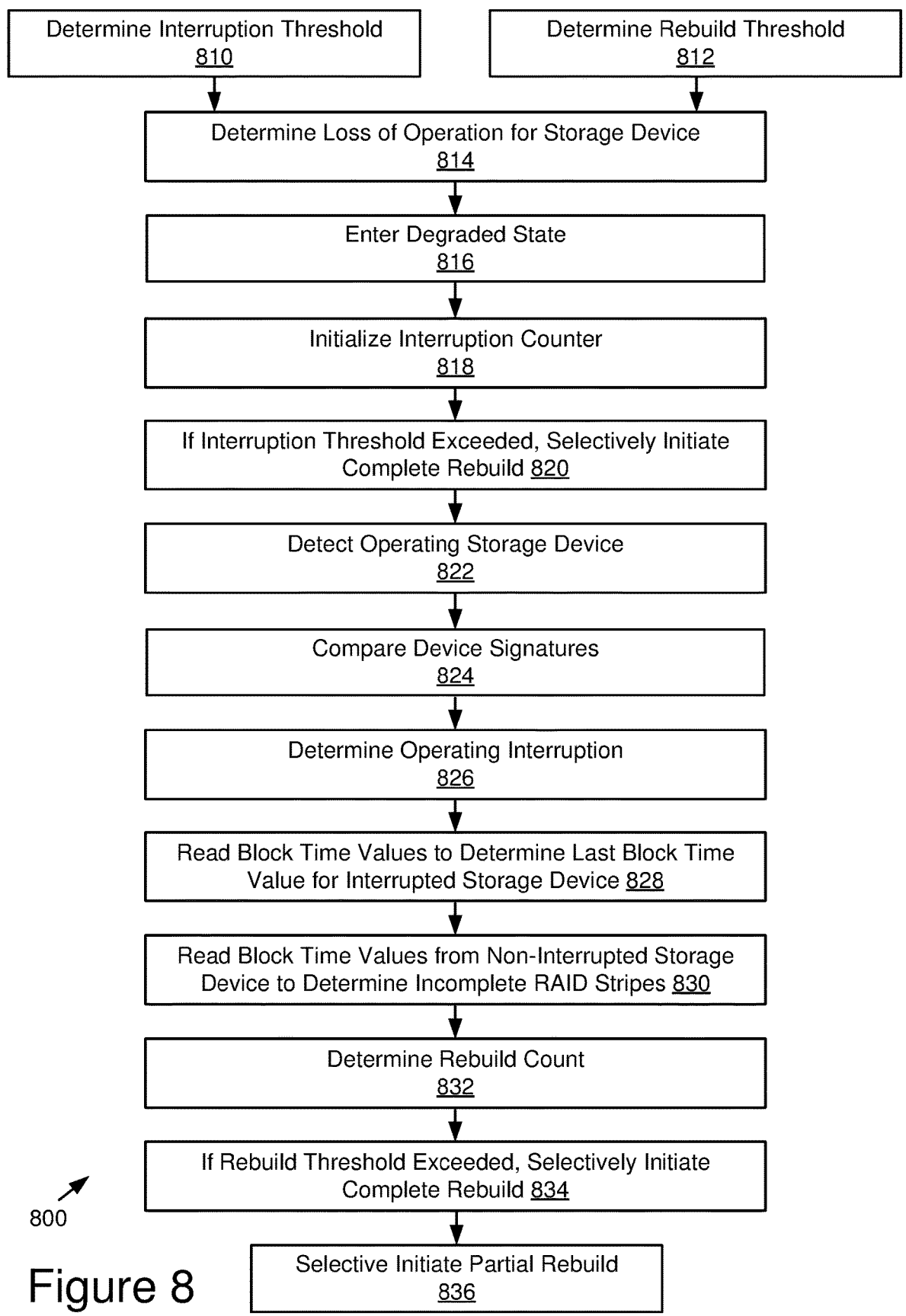
FIG. 8 is a flowchart of an example method of determining operating interruptions for selectively initiating partial rebuilds of a RAID set of data storage devices.

As shown in FIG. 8, storage system 500 may be operated according to an example method for determining operating interruptions for selectively initiating partial rebuilds of a RAID set of data storage devices, i.e., according to method 800 illustrated by blocks 810-836 in FIG. 8.

At block 810, an interruption threshold may be determined. For example, the controller may read a user configured interruption threshold from RAID configuration parameters.

At block 812, a rebuild threshold may be determined. For example, the controller may read a user configured complete rebuild threshold from RAID configuration parameters.

At block 814, loss of operation for a storage device may be determined. For example, the controller may detect that a data storage device has gone offline, lost power, and/or is no longer responding to communication attempts.

At block 816, a degraded state may be entered. For example, the controller may change its operating state to degraded and notify host systems that the RAID set is no longer accepting storage operations until a rebuild is completed and normal operations may be returned.

At block 818, an interruption counter may be initialized. For example, the controller may initialize a time-based or event-based counter for determining a duration of the loss of operation determined at block 814.

At block 820, if the interruption threshold is exceeded, a complete rebuild may be selectively initiated. For example, the interruption threshold set at block 810 may determine how long the controller should wait for the return of the storage device before determining that a complete rebuild should be initiated (e.g., when the storage device finally does return, a replacement device is detected in its slot, or a replacement drive can be selected from another location, such as reserved drives or hot spares).

At block 822, an operating data storage device may be detected. For example, the controller may detect that a storage device has reappeared or established communications from a physical slot that was previously occupied by the lost storage device or another physical slot associated with the RAID set.

At block 824, device signatures may be compared. As part of the storage device initialization and/or detection, a unique device signature value may be provided by the storage device detected at block 822 and compared to the device signature previously stored in RAID metadata or other configuration data for the lost storage device.

At block 826, an operating interruption may be determined. For example, based on the operating storage device being detected prior to the interruption threshold and the device signature matching that of the lost storage device, the controller may determine that an operating interruption has occurred and the interrupted storage device may still have the allocated RAID blocks for a number of complete and synchronized RAID stripes.

At block 828, block time values may be read from the interrupted storage device to determine a last block time value for the most recent RAID block written to the interrupted storage device. For example, the controller may initiate read operations for each RAID block in the interrupted storage device, targeting the block time values stored with each RAID block, and compare them to one another to find the highest time counter value corresponding to the last block time value.

At block 830, block time values may be read from at least one uninterrupted storage device to determine incomplete RAID stripes. For example, the controller may initiate read operations for each RAID block in one of the uninterrupted storage devices to determine the most recent RAID stripe written to the uninterrupted storage devices and compare them to the last block time value (from block 828) to determine RAID blocks (and corresponding incomplete RAID stripes) with a higher block time value (corresponding to higher time counter values for the incomplete RAID stripe).

At block 832, a rebuild count may be determined. For example, the controller may count the number of incomplete RAID stripes determined at block 830.

At block 834, if the rebuild threshold is exceeded, complete rebuild may be selectively initiated. For example, the controller may determine that there are more incomplete RAID stripes than allowed by the rebuild threshold and initiate a complete rebuild.

At block 836, a partial rebuild may be initiated. For example, if the number of incomplete RAID stripes is less than the rebuild threshold, the controller may initiate the partial rebuild of only the incomplete RAID stripes.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
 a plurality of data storage devices comprising a non-volatile storage medium configured to store host data, wherein:
  the host data is configured in a plurality of redundant array of independent disks (RAID) blocks;
  each RAID block corresponds to a RAID stripe distributed across the plurality of data storage devices;
  each RAID block has a block time value corresponding to a time when that RAID block was stored to the corresponding data storage device of the plurality of data storage devices; and
  each data storage device of the plurality of data storage devices is configured to store, in metadata storage, a device time value corresponding to a time when a most recent RAID block of a most recent RAID stripe was stored in the non-volatile storage medium for that data storage device; and a RAID controller configured to:
determine an operating interruption for at least one data storage device of the plurality of data storage devices;
determine, responsive to the operating interruption, a last block time value for a last RAID block stored by the at least one data storage device;
determine, based on the last block time value, at least one incomplete RAID stripe; and
selectively rebuild the at least one incomplete RAID stripe.

2. The system of claim 1, wherein each data storage device of the plurality of data storage devices is configured to store, adjacent to each RAID block in the non-volatile storage medium, the block time value of that RAID block.

3. The system of claim 2, wherein each data storage device of the plurality of data storage devices is:
configured as a block storage device including:
a host data block size; and
an extended block size that defines additional storage locations beyond the host data block size for each host data block; and
further configured to store the block time value in the additional storage locations corresponding to the extended block size for each RAID block.

4. The system of claim 1, wherein each data storage device of the plurality of data storage devices is further configured to return, upon request from the RAID controller, the device time value for determining the at least one incomplete RAID stripe.

5. The system of claim 1, wherein the RAID controller is further configured to:
store, in RAID metadata, a time counter value for a most recent RAID stripe stored in the plurality of data storage devices;
determine, from the at least one data storage device, the last block time value; and
determine, based on the time counter value and the last block time value, the at least one incomplete RAID stripe.

6. The system of claim 5, wherein the RAID controller is further configured to send, to the plurality of data storage devices, the time counter value to be stored as the block time value adjacent to each RAID block in the non-volatile storage medium.

7. The system of claim 5, wherein the RAID controller is further configured to:
selectively increment the time counter value by a configurable granularity threshold; and
write a plurality of RAID stripes to the plurality of data storage devices between each increment.

8. The system of claim 5, wherein the RAID controller is further configured to:
determine, based on the block time values for RAID blocks stored in the at least one data storage device, a last complete RAID stripe; and
determine, based on the block time values for RAID blocks stored in another data storage device of the plurality of data storage devices, the at least one incomplete RAID stripe since the last complete RAID stripe.

9. The system of claim 5, wherein the RAID controller is further configured to:
determine a loss of operation for the at least one data storage device;
enter, responsive to the loss of operation, a degraded state for a RAID set corresponding to the plurality of data storage devices;
detect an operating data storage device corresponding to a position of the at least one data storage device;
determine, based on a device signature, that the operating data storage device is the at least one data storage device; and
determine, responsive to the operating data storage device being the at least one data storage device, the operating interruption.

10. The system of claim 9, wherein the RAID controller is further configured to:
determine an interruption counter to measure an elapsed time from the loss of operation;
determine an interruption threshold;
selectively initiate, responsive to the interruption counter exceeding the interruption threshold, a complete rebuild of the RAID set;
determine a rebuild count of the at least one incomplete RAID stripes;
determine a rebuild threshold; and
selectively initiate, responsive to the rebuild count exceeding the rebuild threshold, the complete rebuild of the RAID set.

11. A computer-implemented method, comprising:
storing, to a plurality of data storage devices comprising a non-volatile storage medium, host data, wherein:
the host data is configured in a plurality of redundant array of independent disks (RAID) blocks;
each RAID block corresponds to a RAID stripe distributed across the plurality of data storage devices; and
each RAID block has a block time value corresponding to a time when that RAID block was stored to the corresponding data storage device of the plurality of data storage devices;
storing, in RAID metadata, a time counter value for a most recent RAID stripe stored in the plurality of data storage devices;
determining an operating interruption for at least one data storage device of the plurality of data storage devices;
determining, responsive to the operating interruption and from the at least one data storage device, a last block time value for a last RAID block stored by the at least one data storage device;
determining, based on the last block time value and the time counter value, at least one incomplete RAID stripe, wherein determining the at least one incomplete RAID stripe includes:
determining, based on the block time values for RAID blocks stored in the at least one data storage device, a last complete RAID stripe; and
determining, based on the block time values for RAID blocks stored in another data storage device of the plurality of data storage devices, the at least one incomplete RAID stripe since the last complete RAID stripe; and
selectively rebuilding the at least one incomplete RAID stripe.

12. The computer-implemented method of claim 11, further comprising:
storing, adjacent to each RAID block in the non-volatile storage medium, the block time value of that RAID block.

13. The computer-implemented method of claim 12, further comprising:
configuring the plurality of data storage devices as block storage devices including:
a host data block size; and
an extended block size that defines additional storage locations beyond the host data block size for each host data block, wherein storing the block time value of each RAID block includes storing the block time value in the additional storage locations corresponding to the extended block size for that RAID block.

14. The computer-implemented method of claim 11, further comprising:
storing, in metadata storage for each data storage device of the plurality of data storage devices, a device time value corresponding to a time when a most recent RAID block of a most recent RAID stripe was stored in the non-volatile storage medium for that data storage device.

15. The computer-implemented method of claim 14, further comprising:
returning, from metadata storage for each data storage device of the plurality of data storage devices, a device time value for that data storage device for determining the at least one incomplete RAID stripe.

16. The computer-implemented method of claim 11, further comprising:
sending, to the plurality of data storage devices, the time counter value to be stored as the block time value adjacent to each RAID block in the non-volatile storage medium.

17. The computer-implemented method of claim 11, further comprising:
selectively incrementing the time counter value by a configurable granularity threshold; and
writing a plurality of RAID stripes to the plurality of data storage devices between each increment.

18. The computer-implemented method of claim 11, further comprising:
determining a loss of operation for the at least one data storage device;
entering, responsive to the loss of operation, a degraded state for a RAID set corresponding to the plurality of data storage devices;
detecting an operating data storage device corresponding to a position of the at least one data storage device;
determining, based on a device signature, that the operating data storage device is the at least one data storage device; and
determining, responsive to the operating data storage device being the at least one data storage device, the operating interruption.

19. A system comprising:
a plurality of data storage devices comprising a non-volatile storage medium configured to store host data, wherein:
the host data is configured in a plurality of redundant array of independent disks (RAID) blocks;
each RAID block corresponds to a RAID stripe distributed across the plurality of data storage devices; and
each RAID block has a block time value corresponding to a time when that RAID block was stored to the corresponding data storage device of the plurality of data storage devices;
means for storing, in RAID metadata, a time counter value for a most recent RAID stripe stored in the plurality of data storage devices;
means for selectively incrementing the time counter value by a configurable granularity threshold;
means for writing a plurality of RAID stripes to the plurality of data storage devices between each increment;
means for determining an operating interruption for at least one data storage device of the plurality of data storage devices;
means for determining, responsive to the operating interruption, a last block time value for a last RAID block stored by the at least one data storage device;
means for determining, based on the last block time value and the time counter value, at least one incomplete RAID stripe; and
means for selectively rebuilding the at least one incomplete RAID stripe.

20. The computer-implemented method of claim 18, further comprising:
determining an interruption counter to measure an elapsed time from the loss of operation;
determining an interruption threshold;
selectively initiating, responsive to the interruption counter exceeding the interruption threshold, a complete rebuild of the RAID set;
determining a rebuild count of the at least one incomplete RAID stripes;
determining a rebuild threshold; and
selectively initiating, responsive to the rebuild count exceeding the rebuild threshold, the complete rebuild of the RAID set.

* * * * *